No. 735,930. PATENTED AUG. 11, 1903.
W. O. WORTH.
ENGINE GOVERNOR.
APPLICATION FILED SEPT. 18, 1902.
NO MODEL. 5 SHEETS—SHEET 1.
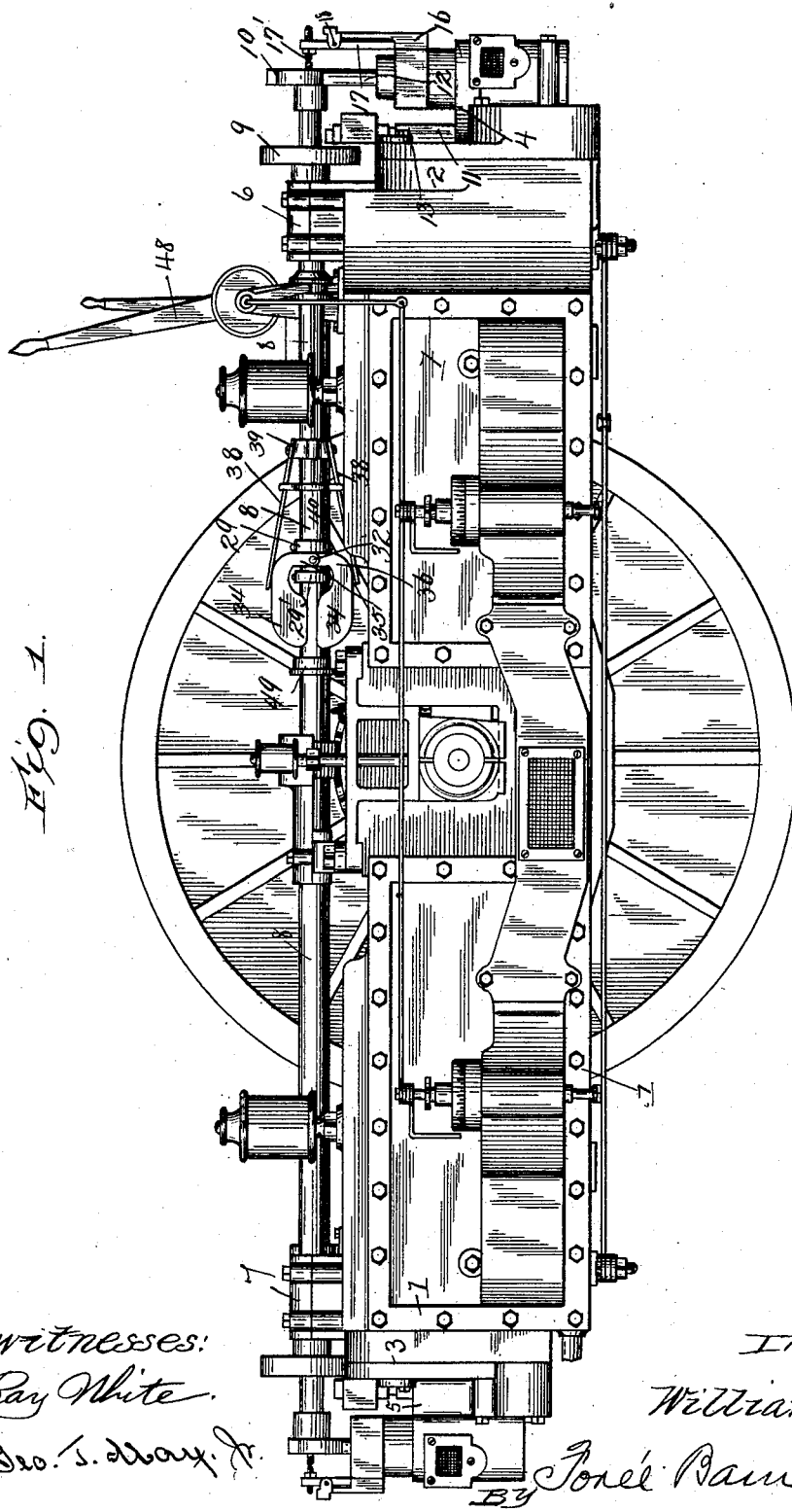
Witnesses:
Ray White
Geo. J. Murray Jr.
Inventor:
William O. Worth
By Toné Bain Atty.

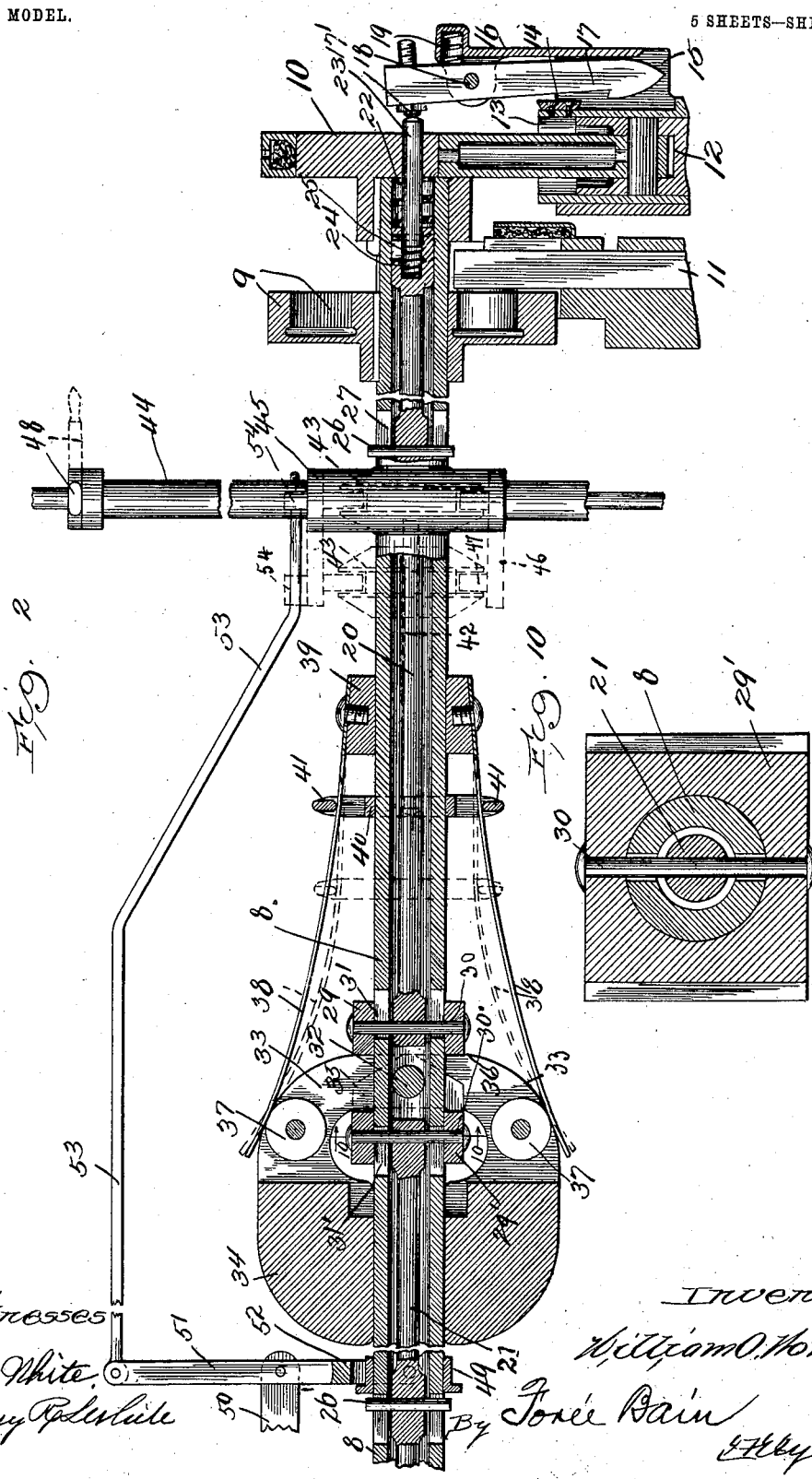

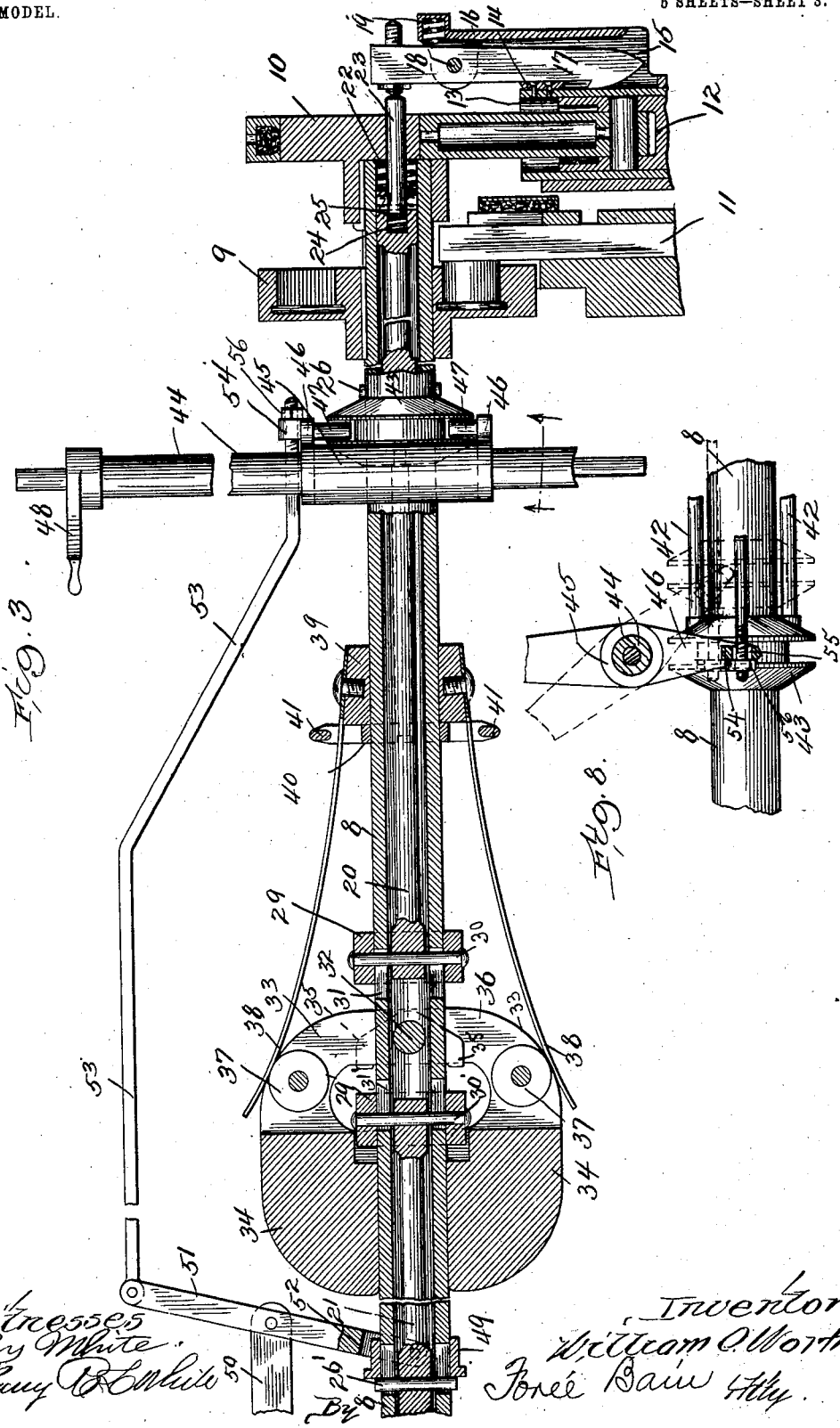

No. 735,930. PATENTED AUG. 11, 1903.
W. O. WORTH.
ENGINE GOVERNOR.
APPLICATION FILED SEPT. 18, 1902.
NO MODEL. 5 SHEETS—SHEET 4.
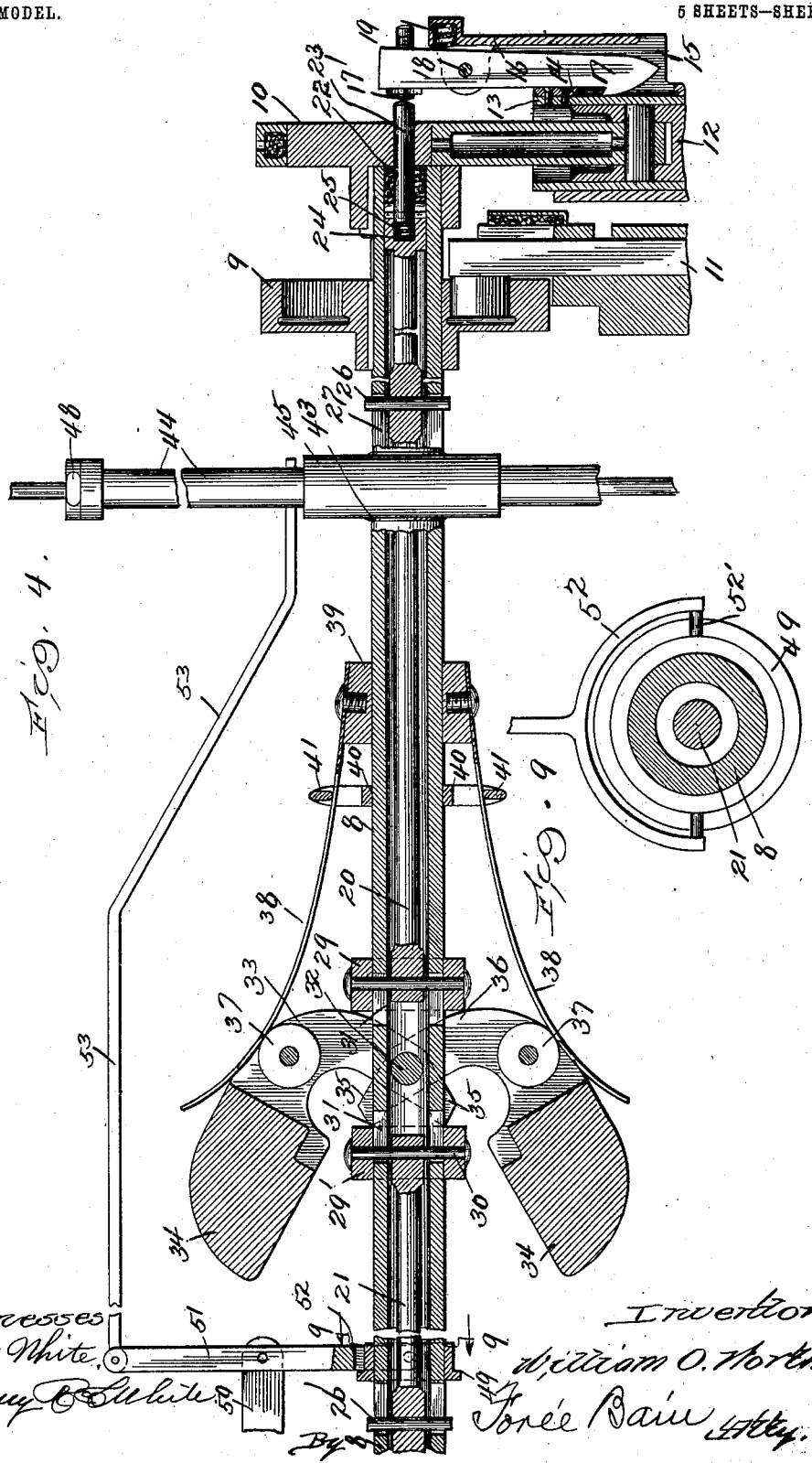

No. 735,930. PATENTED AUG. 11, 1903.
W. O. WORTH.
ENGINE GOVERNOR.
APPLICATION FILED SEPT. 18, 1902.
NO MODEL. 5 SHEETS—SHEET 5.
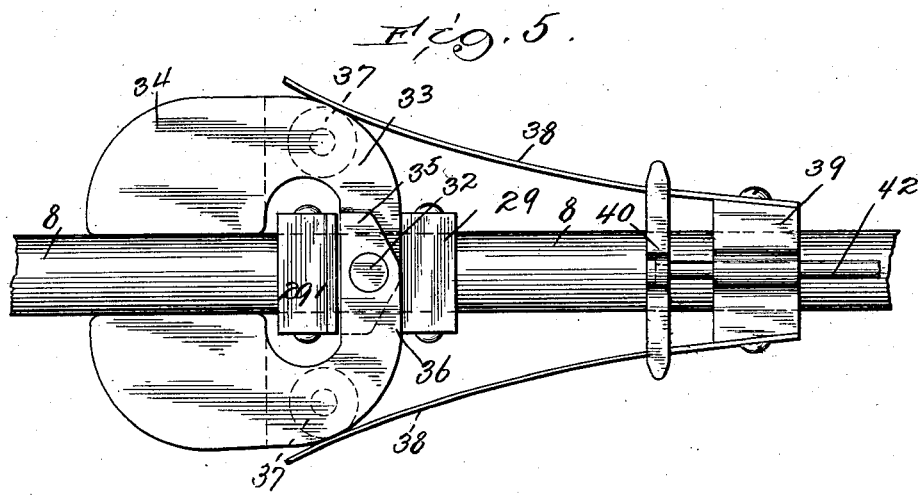
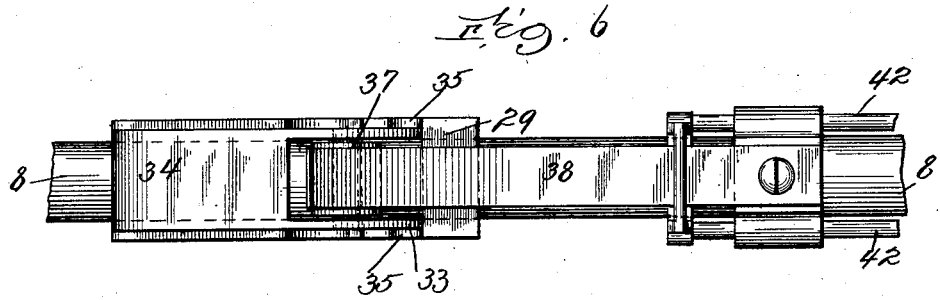
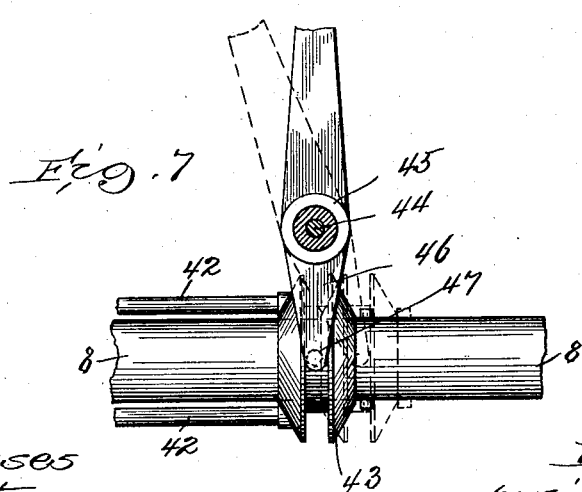
Witnesses
Ray White
Harry C. White
Inventor
William O. Worth
By Foree Bain Atty.

No. 735,930. Patented August 11, 1903.

UNITED STATES PATENT OFFICE.

WILLIAM O. WORTH, OF CHICAGO, ILLINOIS, ASSIGNOR TO CHICAGO MOTOR VEHICLE COMPANY, A CORPORATION OF ILLINOIS.

ENGINE-GOVERNOR.

SPECIFICATION forming part of Letters Patent No. 735,930, dated August 11, 1903.

Application filed September 18, 1902. Serial No. 123,879. (No model.)

*To all whom it may concern:*

Be it known that I, WILLIAM O. WORTH, of Chicago, in the county of Cook and State of Illinois, have invented certain new and useful Improvements in Engine-Governors; and I hereby declare that the following is a full, clear, and exact description thereof, reference being had to the accompanying drawings, which form part of this specification.

My invention relates to improvements in engine-governors, and the particular embodiment thereof hereinafter described relates to governors employed in conjunction with gas-engines to regulate the operation of the valves thereof.

One of the objects of my invention is to provide a regulating means for gas-engine valves capable of either automatic or manual operation.

A further object is to provide manual means for regulating the operation of automatic governing devices.

A further object of my invention is to provide a single set of operating instrumentalities capable of both operating the valve-governing devices and regulating the automatic governor devices.

A further object of my invention is to provide a single set of governing instrumentalities capable of simultaneously operating two sets of valves.

A further object of my invention is to generally improve the construction and arrangement of gas-engine governors.

With a view to accomplishing these and other objects, which will become apparent to those skilled in the art from the following description, my invention consists in the features of construction and arrangement hereinafter described, and pointed out in the claims.

In the drawings, Figure 1 represents an engine adapted for the propulsion of a motor-vehicle embodying my improved governor. Fig. 2 is a broken sectional elevation of a portion of my device, showing in full lines the parts in normal position and showing in dotted lines the operation of the governor-regulating means. Fig. 3 is a similar view showing the position assumed by the parts when the valve-governing device is operated manually. Fig. 4 is a similar view illustrating the position assumed by the parts when the valve-controlling device is operated by the automatic governor. Fig. 5 is a side elevation of a governor and associated parts. Fig. 6 is a top plan view of the same. Figs. 7 and 8 are detail sectional elevations taken from opposite sides of the controlling-lever and associated parts, illustrating different positions of adjustment. Fig. 9 is an enlarged detail sectional elevation taken on lines 9 9 of Fig. 4. Fig. 10 is an enlarged sectional detail taken in line 10 10 of Fig. 2.

Throughout the drawings like numerals of reference refer to like parts.

In the drawings, 1 represents the frame of a gas-engine provided with two cylinders 2 and 3, arranged on opposite sides of the driving-shaft.

4 and 5 represent the casings of the inlet-valves supplying fuel to the cylinders.

One form of valve and valve-gearing in conjunction with which my governor may be advantageously employed is illustrated in detail in my pending application filed May 10, 1902, and having Serial No. 106,678, and I have herein illustrated fragments of said valve motion to illustrate an operative application of my improved governor.

6 and 7 are bearing-blocks mounted on the framework 1 and supporting the horizontal rotary shaft 8, which operates the valve mechanism.

9 and 10 are cams keyed upon the shaft 8 and serving to operate suitable valves by means of stems 11 and 12, respectively, in the manner described in my aforesaid application.

13 is a fragment of a shell separate from the valve-stem 12, but normally movable therewith and forming a section of a two-part valve operatable through the agency of the valve-rod. 14 is a clip or catch secured to said shell and projecting into a channel 15, formed in a stationary bracket 16 of the engine-frame.

17 is a hook or detent pivoted at 18 in the bracket 16 and normally held out of the path of movement of the clip 14 by a spring 19.

17' is an adjustable contact-screw projecting from the face of the detent 17.

The specific valve parts shown or suggested herein are introduced merely to illustrate an advantageous utilization of my invention and are not otherwise germane to the present invention.

The shaft 8 is hollow throughout its length and contains a controlling shaft or rod divided into two separate sections 20 and 21, rotatable with the shaft 8, but capable of longitudinal movement relative thereto. The shaft-sections 20 and 21 and the devices associated with each section are substantially identical, and I will therefore confine my description to one section, it being understood that the parts described are reproduced in conjunction with the other section.

22 is a helical spring arranged between the end of the shaft-section 20 and the face of cam 10, closing the end of the hollow shaft 8.

23 is a pin mounted in a socket 24 and extending axially through the cam 10 into contact with the bearing-screw 17' in the end of the pivoted detent 17.

25 is a coiled spring seated in the socket 24 and abutting against the inner end of the pin 23.

26 is a pin carried by the shaft-section 20 and projecting a short distance through diametrically-arranged longitudinally-extended apertures 27 in the exterior shaft 8.

29 29' are collars exteriorly mounted on the shaft 8 and secured to the inner extremities of the interior shaft-sections 20 and 21, respectively, by means of pins 30 30', extending through elongated slots 31 31' in the shaft 8.

32 represents a stud extending diametrically through the shaft 8 between the adjacent ends of the interior shaft-sections 20 and 21 and projecting therefrom to afford exterior pivotal bearings for the weighted arms 33 of a centrifugal-governor device. Each arm 33 comprises a weighted head 34, arranged when at rest to lie parallel to the shaft, and a bifurcated end arranged to straddle the shaft and normally rest at right angles thereto. Each leg of the bifurcated portion provides a toe 35 and a heel 36, disposed on opposite sides of the shaft.

37 represents rolls mounted in bifurcated portions and affording sliding bearings for leaf-springs 38, secured to a collar 39, fixed to the shaft 8 and tending to hold the governor in a condition of rest, as shown in Fig. 2.

40 is an annular ring slidably mounted on the shaft 8 and having apertured guiding wings or extensions 41, adapted to receive the leaf-springs 38. 42 represents guide-rods secured to said ring 40 and to a slidable peripherally-grooved collar 43, mounted on the shaft 8 just inward from the apertures 27.

44 is a transverse hollow shaft having fixed thereto a sleeve 45.

46 represents lugs depending from the sleeve 45 and carrying at their lower extremities inwardly-directed pins 47, engaging the peripheral groove of collar 43.

48 is a hand-lever secured to the shaft 44 at some convenient point. If my device is used in connection with a motor-vehicle engine, the lever is preferably extended into proximity with the driver's seat.

49 is a flanged collar slidably mounted on shaft 8 and related to pin 26' of shaft-section 21 as collar 43 is to the corresponding pin of shaft-section 20.

50 is a bearing projection from a stationary part of the engine or frame. 51 is a lever pivoted thereto, having a bifurcated end 52 partially encircling the collar 49 and having studs 52' engaging said collar inward of the flange thereof.

53 is a link pivotally connected to the free end of lever 51 and extending into proximity to the transverse shaft 44. Said link is suitably shaped to avoid interference with the rotation of the governor.

54 is an ear extending laterally from one of the lugs 46 of the sleeve 45. 55 is an aperture in said ear adapted to loosely receive the end of the link 53. 56 is a nut threaded upon the end of said link.

When the device thus described is at rest, its parts assume the position illustrated in full lines in Fig. 2, with the controller-shaft sections forced inward by the springs to the limit of their movements, the hand-lever upright, and the governor-regulating ring 40 somewhat removed from the collar 39 and holding the springs 38 under normal tension. When the governing devices are so positioned, the catch 17 occupies its inoperative position under the tension of spring 19. If now the engine is started and the governor device acquires a speed of rotation which throws its arms outward, the heels and toes, respectively, of the bifurcated ends of the governor-arms press against the respective collars 29 and 29' of the shaft-sections 20 and 21, forcing said shaft-sections outwardly. If the shaft-sections are moved to a sufficient extent, determined by the adjustment of the contact 17' and the strength of the spring 19, the detent is moved so that its hook intercepts the path of movement of the clip 14 and varies the operation of the valve in such a manner as to decrease the speed of the engine, as by cutting off the fuel-supply. When the speed of the shaft is sufficiently decreased, the detent is restored to inactive position by its spring. Thus an automatic regulation of speed of the engine is accomplished. The same result can be accomplished manually irrespective of the position of the governor by the movement of hand-lever 48 to the left, as shown in Fig. 3. By such movement the sleeve 45 is partially rotated, so that the lugs and pins 46 and 47 cause the collar 43 to be moved longitudinally of the shaft. The projection of the pins 26 in the path of said collar causes a corresponding movement of the shaft-section 20 and throws the detent 17 into operative position. A similar movement of the shaft-section 21 is simultaneously effected through the movement of the link 53, engaging at opposite ends with the ear 54 and lever 51, said lever 51 moving the collar 49 outward, and thereby causing the movement of the shaft through engagement with the pin 26'. If it is desired to increase the tension of the springs 38, and thereby permit a higher speed of rotation to be attained by the governor without actuating the governing-detent, the handle 48 is moved to the right, as shown in Fig. 3. Such movement has no effect upon the shaft 8, as the collar 43 is moved away from the pins 26 and the ear 54 slides freely upon the link 53 without moving the same. The connection between the collar and the regulating-ring 40 causes the latter to slide along the shaft, and the connection of the wings 41 correspondingly shortens the effective length of the springs, so increasing their strength.

It will thus be seen that I provide in conjuction with an automatic governor means operatable through a single hand-lever for independently actuating the engine-controlling mechanism or regulating the action of the automatic governor.

While I have described in some detail an operative embodiment of my invention, I do not desire to be understood as limiting myself to the details thereof as described, as it is apparent that slight changes might be made therein without departing from the spirit of my invention.

Having thus described my invention, what I claim as new and useful, and desire to secure by Letters Patent of the United States, is—

1. In combination, an engine-controlling device, a centrifugal governor for automatically actuating the same, and a single operating mechanism for independently actuating said controlling device, and regulating the governor.

2. In combination, an engine-controlling device, a centrifugal governor for automatically actuating the same, and a single manually-operable mechanism susceptible of different movements for independently actuating said controlling device, and regulating the governor.

3. In combination, an engine-controlling device, a centrifugal governor for automatically actuating the same, means independent of the governor for operating said device, means for regulating the operation of the governor, and a single controlling instrumentality for actuating the governor-regulating means and the controller-operating means.

4. In combination, an engine-controlling device, a movable controller-rod for actuating the same, a governor for automatically moving said rod, means for regulating the governor, means independent of the governor for operating the controller-rod, and a hand-lever for independently actuating said regulating and operating means.

5. In combination, an engine-controlling device, a controller-rod for actuating the same, a governor for actuating said rod, means for regulating said governor, a hand-lever, connections between said lever and the regulating means arranged to permit lost motion in one direction, and a connection between the lever and controller-rod arranged to permit lost motion in the opposite direction.

In testimony that I claim the foregoing as my own I affix my signature in presence of two witnesses.

WILLIAM O. WORTH.

Witnesses:
FORÉE BAIN,
MARY F. ALLEN.